(12) United States Patent
Hodgman

(10) Patent No.: US 8,904,524 B1
(45) Date of Patent: Dec. 2, 2014

(54) DETECTION OF FAST FLUX NETWORKS

(75) Inventor: Roy Hodgman, Wenham, MA (US)

(73) Assignee: EMC Corporation, Hopkinton, MA (US)

( * ) Notice: Subject to any disclaimer, the term of this patent is extended or adjusted under 35 U.S.C. 154(b) by 97 days.

(21) Appl. No.: 13/245,926

(22) Filed: Sep. 27, 2011

(51) Int. Cl.
*G06F 12/14* (2006.01)

(52) U.S. Cl.
USPC .......................................................... 726/22

(58) Field of Classification Search
CPC ................................................. H04L 2463/144
USPC ....................................................... 726/22, 26
See application file for complete search history.

(56) References Cited

U.S. PATENT DOCUMENTS

| | | | |
|---|---|---|---|
| 8,205,258 B1 * | 6/2012 | Chang et al. ...................... | 726/22 |
| 8,260,914 B1 * | 9/2012 | Ranjan ........................... | 709/224 |
| 2010/0115621 A1 * | 5/2010 | Staniford et al. ................ | 726/25 |
| 2010/0235915 A1 * | 9/2010 | Memon et al. ................... | 726/23 |
| 2012/0054869 A1 * | 3/2012 | Yen et al. ........................ | 726/24 |

OTHER PUBLICATIONS

Holz et al., "Measuring and Detecting Fast-Flux Service Networks," Proc. 16th Conf. on Annual Network & Distributed System Security (2008), 12 pages.
Nazario et al., "As the Net Churns: Fast-Flux Botnet Observations," 3rd Int. Conf. on Malicious and Unwanted Software, (2008), 9 pages.

* cited by examiner

*Primary Examiner* — Ellen Tran
(74) *Attorney, Agent, or Firm* — BainwoodHuang

(57) ABSTRACT

Improved techniques of identifying a malicious communication involve a lightweight evaluator obtaining a domain name directly from a network transmission. The lightweight evaluator performs a query of the domain name on a database of known network transactions. Results of the query include IP addresses to which the domain name has resolved in prior transactions and Time To Live (TTL) values for each of those IP addresses. To such results of the query, the lightweight evaluator applies a set of heuristics which are arranged to determine whether the domain name could plausibly be a FFDN. Based on the result of the application of the heuristics to the domain name, the lightweight evaluator sends to a backend evaluator the domain name and a command to confirm whether the domain name is a FFDN.

23 Claims, 5 Drawing Sheets

| IP Address | Domain Name ID | TTL |
|---|---|---|
| 1.2.3.4 | Domain1.com | 1500 |
| 2.3.4.5 | Domain2.com | 3100 |
| 3.4.5.6 | Domain1.com | 1700 |
| 4.5.6.7 | Domain1.com | 20 |
| 5.6.7.8 | Domain1.com | 8 |

Figure 3

DETECTION OF FAST FLUX NETWORKS

BACKGROUND

Fast Flux refers to techniques of hiding malware delivery sites or other types of servers by cycling mappings of a domain name to different IP addresses. Using such techniques, a command and control (C2) server which controls a set of hosts as part of a botnet frequently changes the mapping of a fully qualified domain name to an IP address of one of the hosts. In this way, the C2 server can thwart attempts by network administrators to block data to and from the botnet. A Fast Flux Network (FFN) is a set of hosts and a server or a set of servers which controls the hosts using Fast Flux techniques; a domain name which resolves to IP addresses of a set of hosts of a FFN is a Fast Flux Domain Name (FFDN).

Conventional methods of ascertaining whether a domain name is a FFDN involve an external server which examines links from suspicious messages and applies fast flux metrics to a domain name (i.e., quantifies the likelihood that the domain name is a FFDN) contained in the links. Such fast flux metrics use information derived about domain names including results of DNS queries and translations of IP addresses to Autonomous System Numbers (ASNs). From the query results, the external server can deduce, for example, IP addresses to which the domain name resolve and an approximate geolocation corresponding to each IP address. For example, a fast flux metric assigns a numerical value to a domain name, which numerical value is proportional to a mean distance between geolocations derived from the domain name.

If the fast flux metric of a domain name is greater than a threshold value, the conventional methods further involve the external server identifying the domain name as a FFDN and informing a network administrator of the identification. The network administrator uses the identification of the domain name as a FFDN as a basis for preventing communications to and from web sites which use the domain name as an identifier.

SUMMARY

Unfortunately, there are deficiencies with the conventional methods of ascertaining whether a domain name is a FFDN. For example, the external server evaluates all received domain names regardless of any likelihood that the domain name could be a FFDN. Because the external server evaluates all received domain names, there tends to be long latencies in notifying administrators of FFDNs. That is, by the time the external server obtains results of DNS queries concerning links in a suspicious message and translations of IP addresses to ASNs, the computer which had received the message may have already been compromised. Significant damage to the computer and the network to which the computer belongs can occur by the time the external server determines that the domain name associated with the link in the message is a FFDN.

Further, the conventional methods of ascertaining whether a domain name is a FFDN rely on messages containing links involving domain names which the external server investigates. There are, however, ways for a user to access web sites other then clicking on links in messages. For example, a user can simply type an address into an address box in a web browser on the user's computer. In this way, an external server would miss FFDNs simply because access to web sites belonging to the FFDNs did not occur through a message.

In contrast to the above-described conventional methods which can take too much time to determine whether a domain name is a FFDN and which are limited to investigating domain names from messages, improved techniques of identifying a malicious communication to or from a malware delivery site hosted on a FFDN involve a lightweight evaluator obtaining a domain name directly from a network transmission. The lightweight evaluator performs a query of the domain name on a database of known network transactions. Results of the query include IP addresses to which the domain name has resolved in prior transactions and Time To Live (TTL) values for each of those IP addresses. To such results of the query, the lightweight evaluator applies a set of heuristics which are arranged to determine, through the computation of a risk score, whether the domain name could plausibly be a FFDN. Based on whether the risk score is larger than a threshold risk score, the lightweight evaluator sends to a backend evaluator the domain name and a command to confirm whether the domain name is a FFDN.

Advantageously, the lightweight evaluator acts as a filter for a backend evaluator which performs a more detailed analysis on domain names. Thus, the time it takes to determine whether a domain name is a FFDN is reduced. A further advantage of the improved techniques lies in the use of outgoing traffic as a source of domain names. Because outgoing traffic is used, all sources of domain names identifying web sites, not just messages, are used in finding potential FFDNs. Further, the backend evaluator can use the risk score computed by the lightweight evaluator to prioritize the analysis of the domain name in the request. That is, high scoring domain names from the lightweight evaluator can be moved to the front of the queue of requests for detailed analysis going to the backend evaluator.

One embodiment of the improved technique is directed to a method of identifying a malicious communication. The method includes reading a domain name identifier from a network transmission. The method also includes performing a lightweight evaluation of the domain name identifier to ascertain whether the network transmission corresponds to a fast flux network to generate a lightweight evaluation result. The method further includes providing an evaluation command to a backend evaluator, the evaluation command directing the backend evaluator to perform a backend evaluation of the domain name identifier to confirm whether the network transmission corresponds to a FFN if the lightweight evaluation result indicates a likelihood that the network transmission corresponds to a fast flux network (FFN) and not providing the evaluation command to the backend evaluator if the result of the lightweight evaluation result indicates a likelihood that the network transmission does not correspond to a FFN.

Additionally, some embodiments of the improved technique are directed to a system for identifying a malicious communication. The system includes a network interface coupled to a network, a memory and a processor coupled to the memory, the processor configured to carry the method of identifying a malicious communication.

Furthermore, some embodiments of the improved technique are directed to a computer program product having a non-transitory computer readable storage medium which stores code including a set of server instructions to carry the method of identifying a malicious communication.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 3 is a schematic diagram illustrating a database of prior transactions accessed by the lightweight evaluator within the electronic environment shown in FIG. 1.

DETAILED DESCRIPTION

Improved techniques of identifying a malicious communication involve a lightweight evaluator obtaining a domain name directly from a network transmission. The lightweight evaluator performs a query of the domain name on a database of known network transactions. Results of the query include IP addresses to which the domain name has resolved in prior transactions and Time To Live (TTL) values for each of those IP addresses. To such results of the query, the lightweight evaluator applies a set of heuristics which are arranged to determine whether the domain name could plausibly be a FFDN. Based on the result of the application of the heuristics to the domain name, the lightweight evaluator sends to a backend evaluator the domain name and a command to confirm whether the domain name is a FFDN.

Suppose that a user accesses a web site from a user computer over a network. The user specifies the web site through a Uniform Resource Locator (URL) address which includes a domain name. The domain name refers to a server which hosts the content on the web site and resolves to an IP address which specifies the server's location in the network. The access of the web site takes place through a network transmission originating from the user and which travels to the domain name server destination through the network. Before the transmission reaches its destination, however, a lightweight evaluator reads the domain name from the transmission and queries a database for a transaction history which involves the domain name. The transaction history will include a set of IP addresses to which the domain name resolved in the past (i.e., A records) as well as other information, such as TTL values of the IP addresses. From this history, the lightweight evaluator performs a lightweight set of heuristics to assess whether the domain name could possibly be a FFDN. If, for example, the domain name has resolved to 10 IP addresses, 5 of which have TTL values which are less than 10 seconds, the lightweight evaluator sends the domain name to another device which uses more rigorous procedures to confirm whether the domain name is in fact a FFDN. If the device sends a message to the lightweight evaluator confirming that the domain name is a FFDN, then the lightweight evaluator sends an alert to a gateway server which processes outbound traffic from the user computer to block communications to and from URL addresses which include the domain name.

Figure 1:
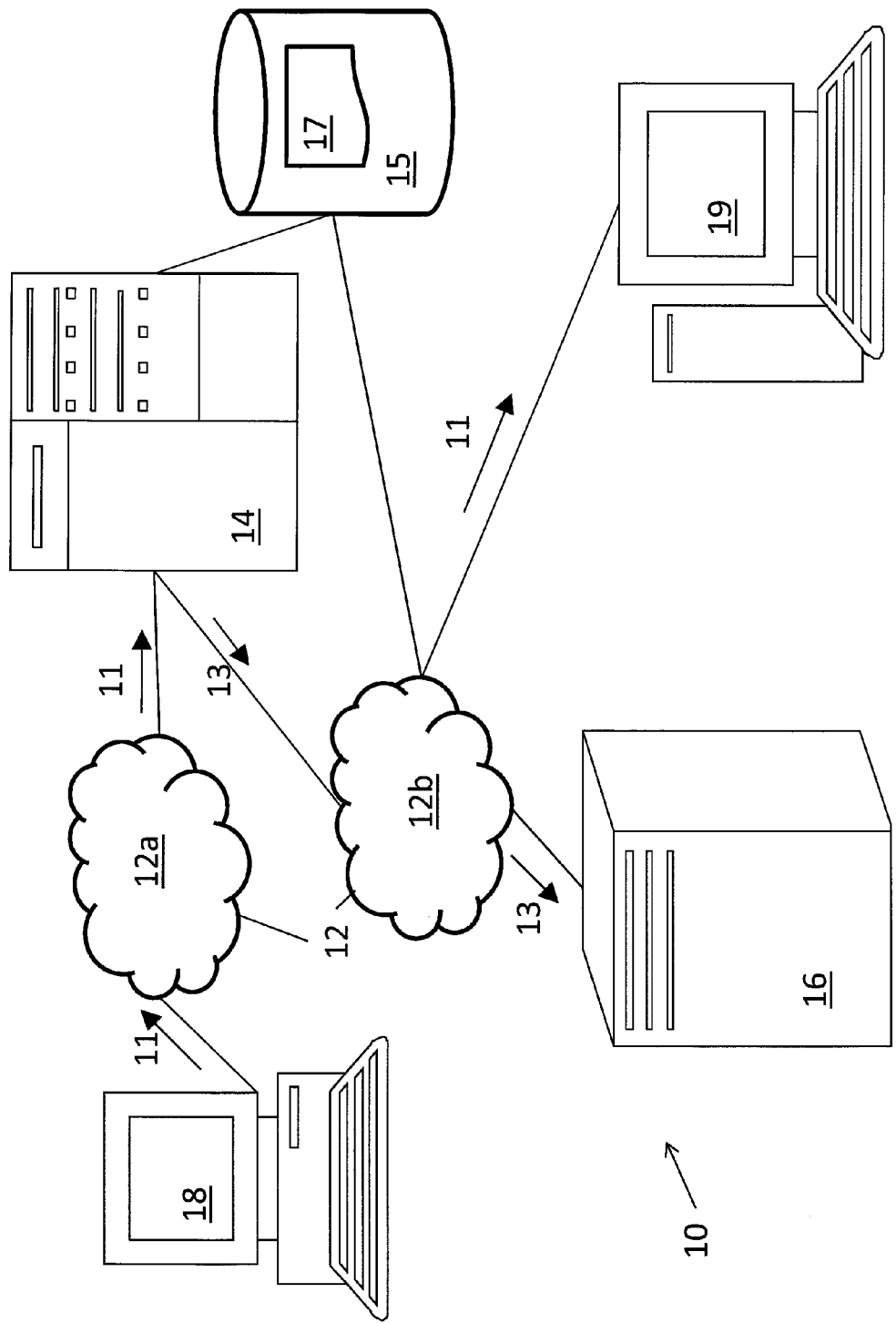
FIG. 1 is a schematic diagram illustrating an electronic environment for carrying out the improved technique.

FIG. 1 illustrates an electronic environment 10 for carrying out the improved technique described above. Electronic environment 10 includes communications media 12a and 12b, lightweight evaluator 14, storage device 15, backend evaluator 16, user computer 18 and destination device 19.

Communication medium 12a provides network connections between user computer 18 and lightweight evaluator 14. Communication medium 12b provides network connections between lightweight evaluator 14, backend evaluator 16, storage device 15 and destination device 19. Communications media 12 may implement a variety of protocols such as TCP/IP, UDP, ATM, Ethernet, Fibre Channel, combinations thereof, and the like. Furthermore, communications media 12 may include various components (e.g., cables, switches/routers, gateways/bridges, NAS/SAN appliances/nodes, interfaces, etc.). Moreover, the communications media 12 are capable of having a variety of topologies (e.g., queue manager-and-spoke, ring, backbone, multi drop, point to-point, irregular, combinations thereof, and so on).

User computer 18 is constructed and arranged to request access, via network transmission 11, to data from destination device 19 located at a node of communications medium 12b. User computer 18 can take the form of a desktop, laptop, tablet, smartphone, or any device which has capability to communicate with device across communications media 12. Typically, a user at user computer 18 is unsophisticated with respect to network security knowledge and therefore user computer 18 is at risk from being compromised by a malicious attacker. Nevertheless, compromised network connections can also put user computer 18 at risk almost independent of the level of sophistication the user has with respect to network security knowledge.

Destination device 19 is constructed and arranged to provide web or any other type of content to user computer 18 upon receiving network transmission 11. Destination device 19 can take the form of a personal computer or a server. Unbeknownst to the user at user computer 19, destination device 19 may be a proxy acting for a malicious user at a command and control (C2) server. In this case, user computer 18 may be compromised upon receiving communications from destination device 19.

Lightweight evaluator 14 is constructed and arranged to read a domain name from a network transmission 11 originating from user computer 18. Lightweight evaluator 14 is positioned downstream from user computer 18 with respect to communications medium 12a. In some arrangements, network transmission 11 will pass by lightweight evaluator 14 on its way to its destination through communications medium 12a. In other arrangements, a separate device within communications medium 12a extracts a domain name from network transmission 11 and sends the domain name to lightweight evaluator 14. In this way, lightweight evaluator 14 can read domain names from all outgoing network transmissions.

Figure 2:
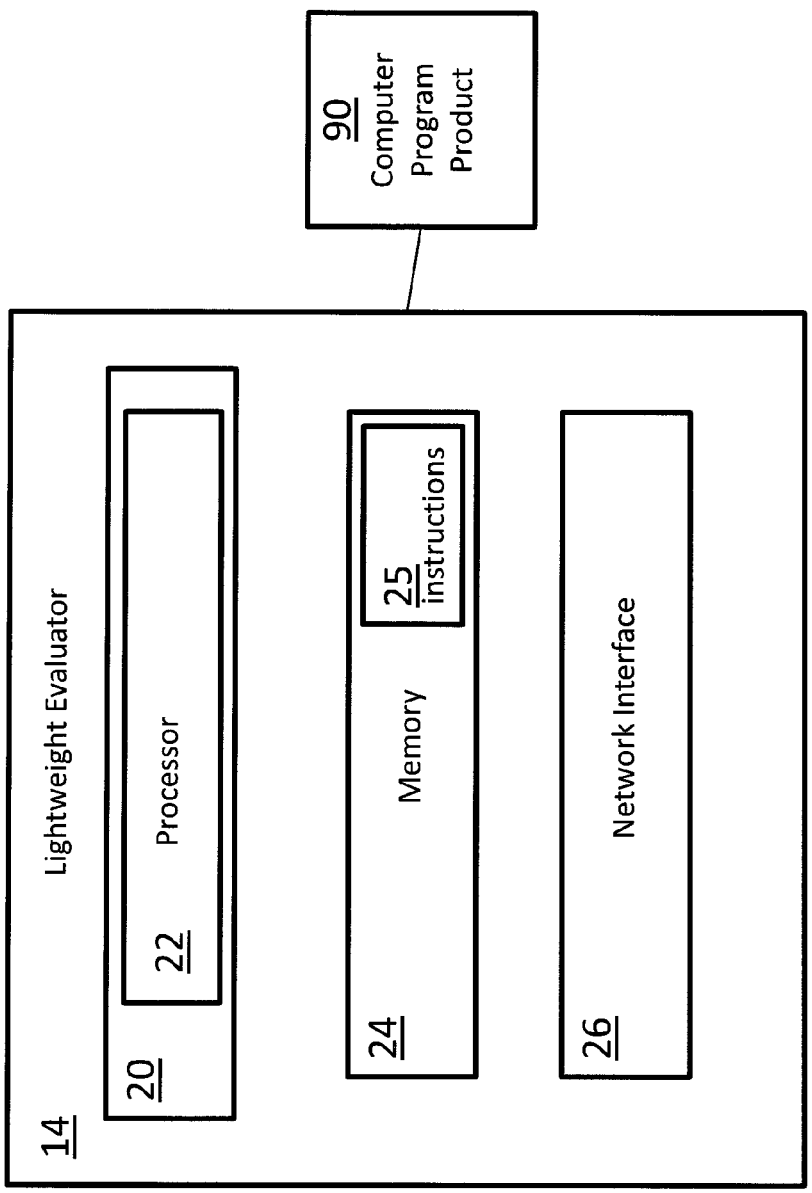
FIG. 2 is a schematic diagram illustrating the lightweight evaluator within the electronic environment shown in FIG. 1.

Further details concerning lightweight evaluator 14 are considered with respect to FIG. 2.

FIG. 2 illustrates components of lightweight evaluator 14. Lightweight evaluator 14 includes a controller 20 which in turn includes a processor 22, a memory 24 and a network interface 26.

Memory 24 is configured to store code which includes instructions 25 to identify a malicious communication. Memory 24 is further configured to store data resulting from identifying the malicious communication. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute instructions 25 stored in memory 24.

Network interface 26 is constructed and arranged to send and receive data over communications medium 12. Specifically, network interface 26 is configured to receive network transmission 11 from user computer 18 over communications medium 12a and to access data from storage device 15 and receive message data from and send messages to backend evaluator 16 over communications medium 12b.

Returning to FIG. 1, storage device 15 is connected to communications medium 12b and directly accessible by lightweight evaluator 14. To this effect, storage device 15 obtains transaction data for transaction database 17 over communication medium 12b. Further, storage device 15 is directly accessible to lightweight evaluator 14 in order to minimize latency. Storage device 15 is constructed and arranged to store transaction database 17. Transaction database 17 includes entries, each of which contains information regarding an A record corresponding to a network transmission in which a domain name resolved to an IP address. In some arrangements, each entry of transaction database 17 also includes a Time To Live (TTL) value of the IP address to which the domain name resolved.

It should be understood that the entries of transaction database 17 represent as many transactions having taken place over communications medium 12b to which transaction database 17 has access, not just those which originated from user computer 18. That is, transaction database 17 is intended to be a global database from which details about as many transactions involving a domain name in question can be retrieved.

Lightweight evaluator 14 is further constructed and arranged to retrieve A records from database 17 which is stored in storage device 15 and perform a lightweight assessment of the domain name based on the retrieved A records. For example, in some arrangements a lightweight assessment is based on the number of IP addresses to which the domain name resolves. In other arrangements, the lightweight assessment is based on the TTL value associated with the IP address or a combination of the TTL value and the number of IP addresses to which the domain name resolves.

Backend evaluator 16 is constructed and arranged to receive domain names and commands to confirm whether the domain name is a FFDN from lightweight evaluator 14. Backend evaluator 16 is also constructed and arranged to perform a backend evaluation in order to confirm whether the domain name is a FFDN. Backend evaluator 16 is further constructed and arranged to send a message to a lightweight evaluator 14, which message includes results of the backend evaluation.

During operation, user computer 18 sends network transmission 11 to a destination device 19 located at a node of the communications medium 12b. On its way to destination device 19, within communications medium 12a, network transmission 11 passes by network interface 26 of lightweight evaluator 14. As described above, in some arrangements, a separate device within communications medium 12a extracts a domain name from network transmission 11 and sends the domain name to lightweight evaluator 14. At this point, processor 22 of lightweight evaluator 14 runs instructions 25 which reads the domain name from network transmission 11 and stores the domain name in memory 24. For example, suppose that network transmission 11 takes the form of a data packet; in this case, processor 22 reads the domain name out of the packet payload which specifies the packet's destination. In some arrangements, an HTTP payload of a TCP data packet contains a URL address which represents the address of the destination device 19; the domain name is then contained within the URL address For example, network transmission 11 is a DNS query originating from user computer 18 before user computer 18 attempts to connect to destination device 19.

Once processor 22 stores the domain name from network transmission 11 in memory 24, processor 22 then accesses, via network interface 26, transaction database 17 on storage device 15 and performs a lookup operation on transaction database 17 using the domain name. In some arrangements, a result of the lookup operation is a set of A records which involve the domain name. That is, the result includes all recorded transactions which involve an IP address to which the domain name resolves.

Upon obtaining the IP addresses returned as a result of the lookup operation, processor 22 performs an assessment operation on the returned IP addresses and/or other returned data in order to evaluate the likelihood of the domain name to which the IP addresses resolve belonging to a FFN. Further details concerning this evaluation are illustrated in FIG. 3.

FIG. 3 shows further details of transaction database 17 which is stored on storage device 15 and is accessed by processor 22. Transaction database 17 includes entries 30(a), 30(b), 30(c), 30(d) and 30(e) (entries 30). Each entry 30 of transaction database 17 includes fields for IP address 32, domain name identifier 34 and TTL value 36. In some arrangements, entries 30 each include indices for facilitating lookup operations, as well as a date each entry 30 was added to transaction database 17 and a date each entry 30 was accessed by processor 22.

In some arrangements, the assessment operation includes a comparison of the number of IP addresses to which the domain name resolved with a threshold number of IP addresses. A typical threshold number of IP addresses is 5, although other values are possible. That is, if the number of IP addresses to which the domain name resolved is greater than 5, then a result of the comparison operation is a high FFDN score which reflects a high likelihood of the domain name being a FFDN. In the example provided in FIG. 3, the domain name domain1.com resolves to 4 IP addresses (1.2.3.4, 3.4.5.6, 4.5.6.7 and 5.6.7.8) while domain2.com resolves to a single IP address (2.3.4.5).

In other arrangements, the assessment operation includes a comparison of a time over which a domain name resolves to a given number of IP addresses with a threshold time. For example, if domain1.com resolves to 12 IP addresses over 30 days, then there is a high likelihood that domain1.com is a FFDN.

It should be understood that likelihood of a domain name being a FFDN is described as a measure of the chance of a domain name being a FFDN. In some arrangements, the likelihood is equal to the probability of the domain name being a FFDN.

In other arrangements, the assessment operation includes a comparison of the TTL values of the IP addresses to a threshold TTL value. A typical threshold TTL value is 10 seconds. That is, if the smallest of the TTL values corresponding to the IP addresses are smaller than 10 seconds, then a result of the comparison operation is a high FFDN score which reflects a high likelihood of the domain name belonging to a FFN. In the example shown in FIG. 3, the IP address 5.6.7.8 has a TTL value of less than 10 seconds; in this case, the domain name domain1.com is said to have a high likelihood of being a FFDN.

It should be understood that processor 22 can change the threshold values described above in response to data collected from running lightweight evaluator 14 or a need to adjust the rate at which backend evaluator 16 receives messages from lightweight evaluator 14.

In further arrangements, the assessment operation also compares TTL values of the obtained IP addresses to each other. For example, if one IP address has a TTL of 2000 seconds while another IP address has a TTL of 5 seconds, then such a large disparity in TTL would also generate a high FFDN score. In the example shown in FIG. 3, there are wide disparities in the TTL values between IP addresses 3.4.5.6 (1700 seconds) and 5.6.7.8 (8 seconds) even thought the same domain name (domain1.com) resolved to them.

In other arrangements, the assessment operation includes an evaluation of the number of prefixes used by the IP addresses returned as a result of the lookup operation. That is, if 5 IP addresses do not have any prefixes in common, then a result of the evaluation operation is a high FFDN score. In the example shown in FIG. 3, none of the IP addresses to which domain1.com resolved begin with the same leading numbers in their IP addresses and therefore do not share a common prefix; such IP addresses have a high likelihood of belonging to different, compromised owners.

Returning to FIG. 1, once processor 22 generates the FFDN score, lightweight evaluator 14 compares the FFDN score to a threshold FFDN score. If the FFDN score is larger than the threshold FFDN score, then processor 22 sends a message 13 via network interface 26 to backend evaluator 16 which includes an evaluation command directing backend evaluator 16 to perform a backend evaluation of the domain name. As a result of the backend evaluation, backend evaluator 16 generates another FFDN score; if the result of the another FFDN score satisfies a certain criterion, then backend evaluator 16 sends a message to lightweight evaluator 14 confirming that the domain name is a FFDN. In some arrangements, backend evaluator 16 sends a message to another network device which investigates over time the domain associated with the domain name; the network device would collect at least most of the IP addresses the domain uses in order to block communications to those IP addresses from gateway routers.

It should be understood that a lightweight evaluation of a domain name is an investigation of the domain name which can be accomplished within a very short time span. In some arrangements, the very short time span is less than about 5 seconds, although other very short time spans are possible. On the other hand, the backend evaluation of the domain name is more rigorous and is accomplished within a longer time span. Examples of a backend evaluation involve performing queries on other Resource Records such as NS and SOA records as well as geolocation determination and ASN evaluation. In some arrangements, the longer time span is about 30 seconds, although other longer time spans are possible.

Advantageously, lightweight evaluator 14 serves as a filter for backend evaluator 16. Because lightweight evaluator 14 uses a set of heuristics that are designed to identify domain names which satisfy a reduced set of conditions which for plausibility being a FFDN, lightweight evaluator 14 also eliminates those domain names which clearly are not FFDNs. Such filtering of the domain names makes the search for FFDNs more efficient and leads to shorter times to determine domain names that a network gateway can block. Because many advanced attacks operate by initially installing a small, nearly undetectable piece of software that only serves to obtain malicious code from a C2 server at some later point, the improved techniques are more likely to stop such malicious code from reaching user computer 18 over a communications medium 12a. Furthermore, domain names which are investigated for association with a FFN come from each transmission that involves a domain name over a network; thus, a much wider net is cast in finding FFNs.

Figure 4:
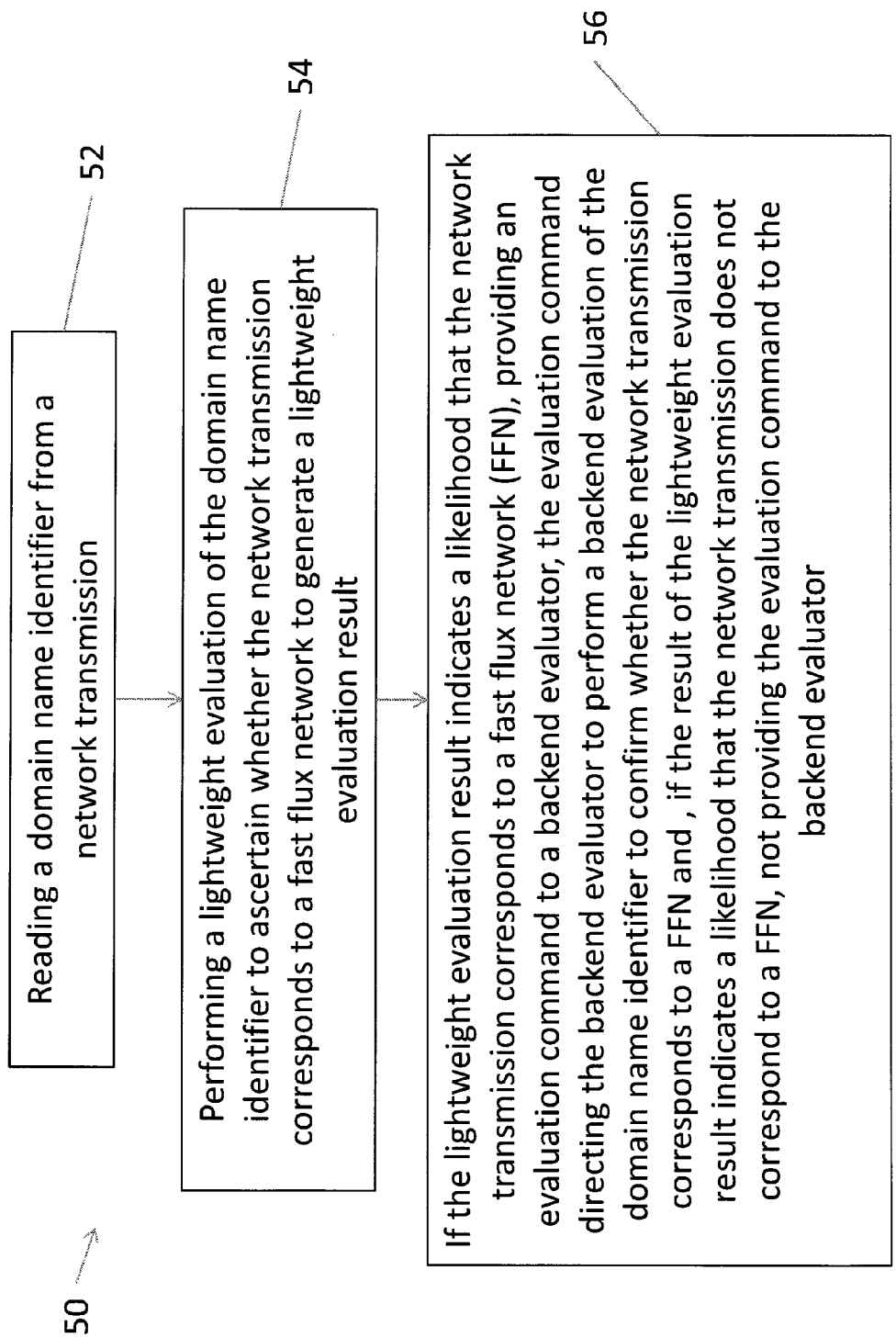
FIG. 4 is a flow chart illustrating a method of carrying out the improved technique within the electronic environment shown in FIG. 1.

FIG. 4 illustrates a method 50 of identifying, by lightweight evaluator 14, a potentially malicious communication to or from a site hosted on a FFN. In step 52, a domain name identifier is read from a network transmission. In step 54, a lightweight evaluation of the domain name identifier is performed to ascertain whether the network transmission corresponds to a fast flux network to generate a lightweight evaluation result. In step 56, an evaluation command is provided to a backend evaluator, the evaluation command directing the backend evaluator to perform a backend evaluation of the domain name identifier to confirm whether the network transmission corresponds to a FFN with a high likelihood if the lightweight evaluation result indicates a likelihood that the network transmission corresponds to a fast flux network (FFN) and the evaluation command is not provided to the backend evaluator if the result of the lightweight evaluation result indicates a likelihood that the network transmission does not correspond to a FFN.

Figure 5:
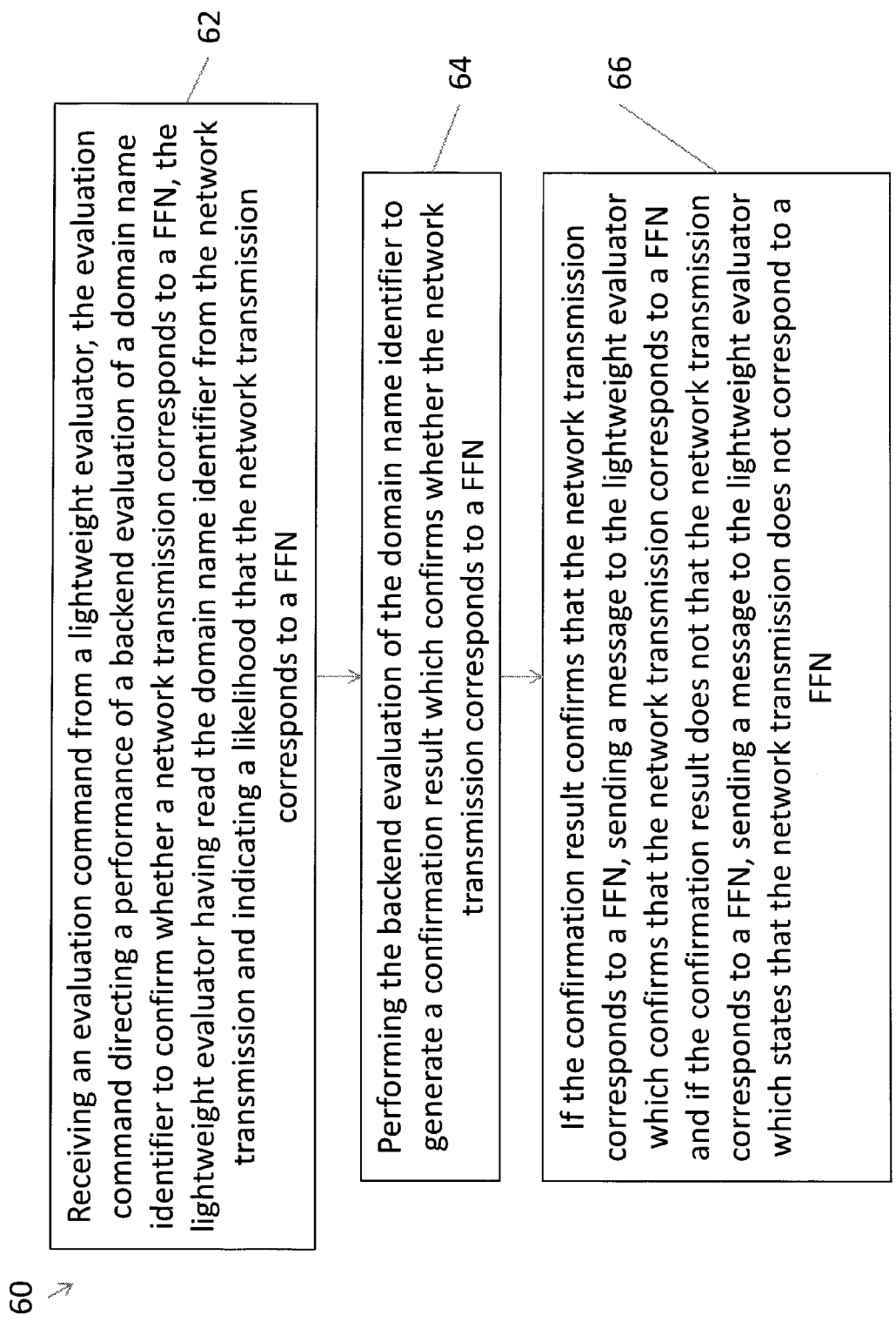
FIG. 5 is a flow chart illustrating another method of carrying out the improved technique within the electronic environment shown in FIG. 1.

FIG. 5 illustrates another method 60 of identifying, by backend evaluator 16, a potentially malicious communication to or from a site hosted on a FFN. In step 62, an evaluation command is received from a lightweight evaluator, the evaluation command directing a performance of a backend evaluation of a domain name identifier to confirm whether a network transmission corresponds to a FFN, the lightweight evaluator having read the domain name identifier from the network transmission and indicating a likelihood that the network transmission corresponds to a FFN. In step 64, the backend evaluation of the domain name identifier is performed to generate a confirmation result which confirms whether the network transmission corresponds to a FFN. In step 66, If the confirmation result confirms that the network transmission corresponds to a FFN, a message is sent to the lightweight evaluator which confirms that the network transmission corresponds to a FFN and if the confirmation result does not indicate that the network transmission corresponds to a FFN, a message is sent to the lightweight evaluator which states that the network transmission does not correspond to a FFN.

While various embodiments of the invention have been particularly shown and described, it will be understood by those skilled in the art that various changes in form and details may be made therein without departing from the spirit and scope of the invention as defined by the appended claims.

For example, it should be understood that A records are associated with IPv4 addresses. The improved techniques, however, can be applied to IPv6 addresses as well.

Also, methods 50 and 60 can be carried out using any suitable machine, device or apparatus.

Further, the improved techniques can perform queries on outgoing requests based on a destination IP address. In this case, backend evaluator 16 performs an investigation as to whether an IP address had been previously observed in any previous FFDN investigations. Such an investigation is less resource intensive than inquiries involving domain names and correlates well with a risk score.

Further, each entry of transaction database 17 can include other parameter values which enhance the ability of lightweight evaluator 14 to quickly perform the lightweight evaluation.

Further, lightweight evaluator 14 can use other metrics to generate a risk score. Other metrics include, for example, number of IP addresses, amount of time since first recorded entry for the domain name, whether the same IP address has been observed for different domain names, as well as others not mentioned here.

Furthermore, it should be understood that some embodiments are directed to lightweight evaluator 14 which is constructed and arranged to identify a malicious communication. Some embodiments are directed to lightweight evaluator 14. Some embodiments are directed to a system which identifies a malicious communication. Some embodiments are directed to a process of identifying a malicious communication. Also, some embodiments are directed to a computer program product which enables computer logic to identify a malicious communication.

In some arrangements, lightweight evaluator 14 is implemented by a set of processors or other types of control/processing circuitry running software. In such arrangements, the software instructions can be delivered to lightweight evaluator 14 in the form of a computer program product 90 (FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of identifying a malicious communication on a local network, the method comprising:
    reading a domain name identifier from a network transmission;
    performing a lightweight evaluation of the domain name identifier to ascertain whether the network transmission corresponds to a fast flux network to generate a lightweight evaluation result;
    if the lightweight evaluation result indicates a likelihood that the network transmission corresponds to a fast flux network (FFN), providing an evaluation command to a backend evaluator, the evaluation command directing the backend evaluator to perform a backend evaluation of the domain name identifier to confirm whether the network transmission corresponds to a FFN; and
    if the result of the lightweight evaluation result indicates a likelihood that the network transmission does not correspond to a FFN, not providing the evaluation command to the backend evaluator;
    wherein performing the lightweight evaluation includes:
        performing a query of the domain name on a local database of known network transactions for all electronic devices connected to the local network, results of the query including IP addresses to which the domain name has resolved in prior transactions and values of a time-to-live (TTL) parameter for each of those IP addresses; and
        applying a set of heuristics to the results, the set of heuristics being arranged to compute a risk score indicating the likelihood that the transmission is a FFN; and
    wherein the method further comprises:
        prioritizing the evaluation commands provided to the backend evaluator according to the risk score, wherein high scoring domain names are moved to the front of a queue of evaluation commands.

2. A method according to claim 1, wherein performing the query of the domain name includes:
    performing a lookup operation on the domain name identifier in the local database, the local database including a set of entries, each entry of the set of entries corresponding to an attempt to access data from a data source at a network location identified by including a domain name identifier, each entry including a domain name identifier, a timestamp and an IP address to which the domain name identifier resolved.

3. A method according to claim 2, wherein each entry of the set of entries of the local database includes an A record which includes a value of the TTL parameter;
    wherein applying the set of heuristics to the results includes:
        performing a comparison operation on values of the TTL parameter of the A records of the entries having IP addresses to which the domain name identifier resolved and a threshold value of the TTL parameter.

4. A method according to claim 3, wherein applying the set of heuristics to the results further includes:
    performing a first comparison operation on values of the TTL parameters of a first entry and a second entry to generate a value of a Delta TTL (DTTL) parameter; and
    performing a second comparison operation on the value of the DTTL parameter and a threshold value of the DTTL parameter.

5. A method according to claim 2, wherein applying the set of heuristics to the results includes:
    counting the number of IP addresses to which the domain name identifier resolved; and
    performing a comparison operation on the number of IP addresses and a threshold number.

6. A method according to claim 5, wherein applying the set of heuristics to the results further includes:
    counting the number of prefixes occupied by the IP addresses; and
    performing a comparison operation on the number of prefixes and a threshold number of prefixes.

7. A method according to claim 2, further comprising:
    receiving a message from the backend FFN evaluator;
    if the message confirms that the domain name identifier resolves to IP addresses which belong to a FFN:
        generating a filter which is constructed and arranged to block communications involving the domain name identified by the domain name identifier;
    if the message does not confirm that the domain name identifier resolves to IP addresses which belong to a FFN:
        allowing communications involving the domain name identified by the domain name identifier.

8. A method as in claim 1,
    wherein reading the domain name identifier from the network transmission includes:
        intercepting the network transmission from a user computer running a web browser configured to issue DNS queries, the user computer constructed and arranged to request, via the DNS queries, access to data from a destination device, the destination device being constructed and arranged to provide content to the user computer.

9. A method as in claim 1,
    wherein the evaluation command to the backend evaluator includes a geolocation determination instruction configured to obtain a geolocation from the domain name; and
    wherein providing an evaluation command to a backend evaluator includes:
        sending the command to perform the geolocation determination instruction on the domain name to the backend evaluator to obtain a geolocation from the domain name.

10. A method as in claim 1,
    wherein applying the set of heuristics to the results includes:

generating the risk score based on at least one value of a risk parameter of a set of risk parameters, the set of risk parameters including a number of IP addresses, an amount of time since first recorded entry for domain name, and whether the same IP address has been observed for different domain names.

11. A method as in claim 10, wherein generating the risk score based on at least one value of a risk parameter of a set of risk parameters includes producing the risk score based on the number of IP addresses and whether the same IP address has been observed for different domain names.

12. A method as in claim 2, wherein performing the lookup operation on the domain name identifier in the local database includes identifying all entries of the set of entries containing the domain name identifier.

13. A method as in claim 1, wherein performing the lookup operation on the domain name identifier in the local database includes accessing the local database in a time span less than 5 seconds as the domain name identifier is read from the network transmission.

14. A method of identifying a malicious communication, the method comprising:
receiving an evaluation command from a lightweight evaluator, the evaluation command directing a performance of a backend evaluation of a domain name identifier to confirm whether a network transmission corresponds to a FFN, the lightweight evaluator having read the domain name identifier from the network transmission and indicating a likelihood that the network transmission corresponds to a FFN;
performing the backend evaluation of the domain name identifier to generate a confirmation result which confirms whether the network transmission corresponds to a FFN;
if the confirmation result confirms that the network transmission corresponds to a FFN:
sending a message to the lightweight evaluator which confirms that the network transmission corresponds to a FFN; and
if the confirmation result does not that the network transmission corresponds to a FFN:
sending a message to the lightweight evaluator which states that the network transmission does not correspond to a FFN;
evaluator;
wherein the lightweight evaluator is configured to perform a query of the domain name on a local database of known network transactions for all electronic devices connected to the local network, results of the query including IP addresses to which the domain name has resolved in prior transactions and values of a time-to-live (TTL) parameter for each of those IP addresses, and apply a set of heuristics to the results, the set of heuristics being arranged to compute a risk score indicating the likelihood that the transmission is a FFN;
wherein the method further comprises:
prioritizing the evaluation commands provided to the backend evaluator according to the risk score, wherein high scoring domain names are moved to the front of a queue of evaluation commands.

15. A system constructed and arranged to identify a malicious communication, the system comprising:
a network interface;
a memory; and
a controller which includes controlling circuitry coupled to the memory, the controlling circuitry constructed and arranged to:
read a domain name identifier from a network transmission;
perform a lightweight evaluation of the domain name identifier to ascertain whether the network transmission corresponds to a fast flux network to generate a lightweight evaluation result;
if the lightweight evaluation result indicates a likelihood that the network transmission corresponds to a FFN, provide an evaluation command to a backend evaluator, the evaluation command directing the backend evaluator to perform a backend evaluation of the domain name identifier to confirm whether the network transmission corresponds to a FFN; and
if the result of the lightweight evaluation result indicates a likelihood that the network transmission does not correspond to a FFN, not provide the evaluation command to the backend evaluator;
evaluator;
wherein performing the lightweight evaluation includes:
performing a query of the domain name on a local database of known network transactions for all electronic devices connected to the local network, results of the query including IP addresses to which the domain name has resolved in prior transactions and values of a time-to-live (TTL) parameter for each of those IP addresses; and
applying a set of heuristics to the results, the set of heuristics being arranged to compute a risk score indicating the likelihood that the transmission is a FFN; and
wherein the controlling circuitry is further constructed and arranged to:
prioritize the evaluation commands provided to the backend evaluator according to the risk score, wherein high scoring domain names are moved to the front of a queue of evaluation commands.

16. A system according to claim 15, wherein performing the query of the domain name includes:
performing a lookup operation on the domain name identifier in the local database, the local database including a set of entries, each entry of the set of entries corresponding to an attempt to access data from a data source at a network location identified by including a domain name identifier, each entry including a domain name identifier, a timestamp and an IP address to which the domain name identifier resolved.

17. A system according to claim 16, wherein each entry of the set of entries of the local database includes an A record which includes a value of the TTL parameter;
wherein applying the set of heuristics to the results includes:
performing a comparison operation on values of the TTL parameter of the A records of the entries having IP addresses to which the domain name identifier resolved and a threshold value of the TTL parameter.

18. A system according to claim 17, wherein applying the set of heuristics to the results further includes:
performing a first comparison operation on values of the TTL parameters of a first entry and a second entry to generate a value of a Delta TTL (DTTL) parameter; and
performing a second comparison operation on the value of the DTTL parameter and a threshold value of the DTTL parameter.

19. A system according to claim 16, wherein applying the set of heuristics to the results includes:
   counting the number of IP addresses to which the domain name identifier resolved; and
   performing a comparison operation on the number of IP addresses and a threshold number.

20. A system according to claim 19, wherein applying the set of heuristics to the results further includes:
   counting the number of prefixes occupied by the IP addresses; and
   performing a comparison operation on the number of prefixes and a threshold number of prefixes.

21. A system according to claim 16, further comprising:
   receiving a message from the backend FFN evaluator;
   if the message confirms that the domain name identifier resolves to IP addresses which belong to a FFN:
      generating a filter which is constructed and arranged to block communications involving the domain name identified by the domain name identifier;
   if the message does not confirm that the domain name identifier resolves to IP addresses which belong to a FFN:
      allowing communications involving the domain name identified by the domain name identifier.

22. A computer program product having a non-transitory computer readable storage medium which stores code to identify a malicious communication, the code including instructions to:
   read a domain name identifier from a network transmission;
   perform a lightweight evaluation of the domain name identifier to ascertain whether the network transmission corresponds to a fast flux network to generate a lightweight evaluation result;
   if the lightweight evaluation result indicates a likelihood that the network transmission corresponds to a FFN, provide an evaluation command to a backend evaluator, the evaluation command directing the backend evaluator to perform a backend evaluation of the domain name identifier to confirm whether the network transmission corresponds to a FFN; and
   if the result of the lightweight evaluation result indicates a likelihood that the network transmission does not correspond to a FFN, not provide the evaluation command to the backend evaluator;
   wherein performing the lightweight evaluation includes:
      performing a query of the domain name on a local database of known network transactions for all electronic devices connected to the local network, results of the query including IP addresses to which the domain name has resolved in prior transactions and values of a time-to-live (TTL) parameter for each of those IP addresses; and
      applying a set of heuristics to the results, the set of heuristics being arranged to compute a risk score indicating the likelihood that the transmission is a FFN; and
   wherein the code contains further instructions to:
   prioritize the evaluation commands provided to the backend evaluator according to the risk score, wherein high scoring domain names are moved to the front of a queue of evaluation commands.

23. A computer program product according to claim 22, wherein performing the query of the domain name includes:
   performing a lookup operation on the domain name identifier in the local database, the local database including a set of entries, each entry of the set of entries corresponding to an attempt to access data from a data source at a network location identified by including a domain name identifier, each entry including a domain name identifier, a timestamp and an IP address to which the domain name identifier resolved.

* * * * *